Aug. 29, 1967   B. A. CLAY   3,338,341
VEHICLE BRAKES
Filed March 21, 1966
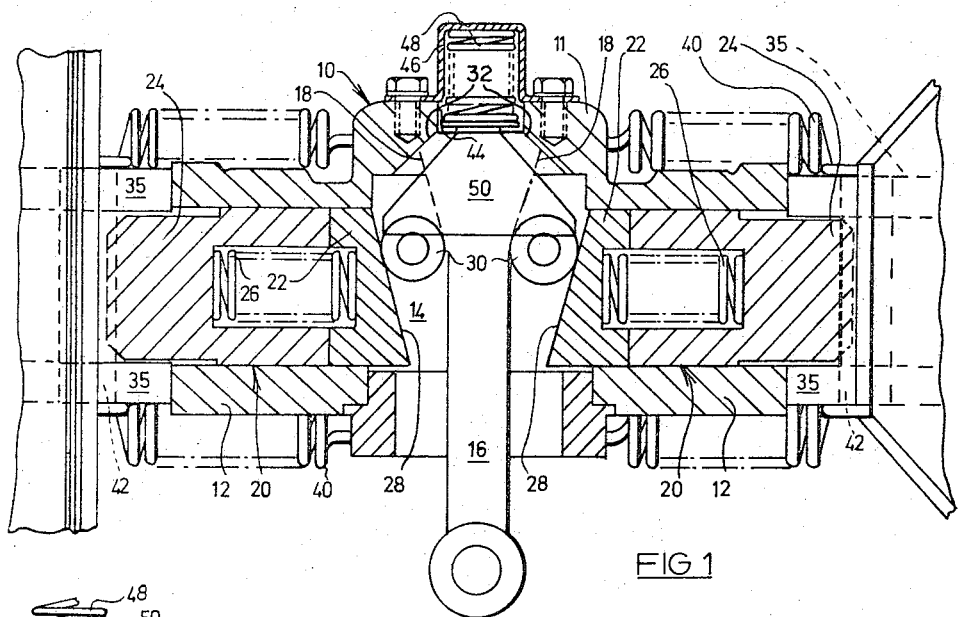
FIG 1
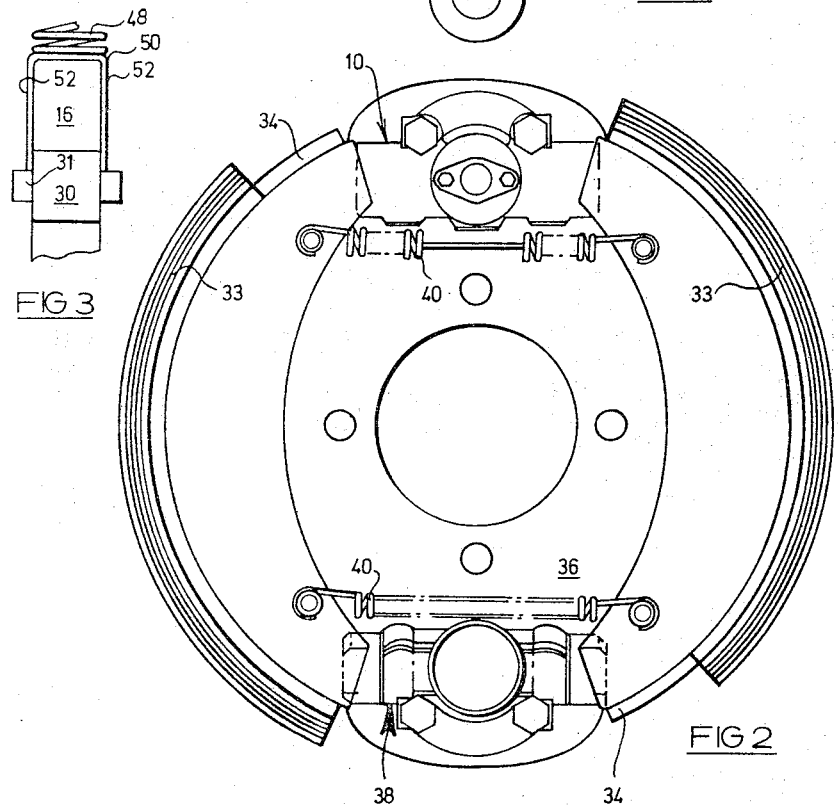
FIG 3
FIG 2

United States Patent Office 3,338,341
Patented Aug. 29, 1967

3,338,341
VEHICLE BRAKES
Benjamin Andrew Clay, West Hagley, Stourbridge, England, assignor to Girling Limited, Tyseley, Birmingham, Warwickshire, England
Filed Mar. 21, 1966, Ser. No. 536,116
Claims priority, application Great Britain, Mar. 19, 1965,
11,654/65, 11,655/65
6 Claims. (Cl. 188—78)

This invention concerns vehicle brakes of the kind in which friction elements are arranged to be displaced into engagement with a braking surface by wedge-type actuating means.

It is usual in wedge-type brake actuating means for one or more wedge members to co-operate with balls or rollers through which an operating movement is transmitted usually by tappets comprising plungers or equivalent members, to the friction elements. A problem arises in such arrangements, however, particularly where balls are used, in that if the vehicle wheel suffers an abrupt displacement as by passing over a hole in the road surface, it is possible for a friction element to act under gravity to overcome its return spring, causing the tappet to move away from the wedge member and ball, allowing the ball to roll down the inclined surface of the tappet which co-operates with the wedge surface. The alignment of the ball between the wedge member and tappet is thus jeopardized and damage to the actuator housing may result, the ball in extreme cases lodging between the housing and the adjoining edge of the wedge member.

According to the present invention the tappet is made of two part construction with compression spring means arranged between said parts to urge them respectively towards the friction element and the wedge member.

Thus, when abrupt displacement of the vehicle wheel occurs as described, the tappet part co-operating with the friction element, due to its inertia, follows any consequential displacement of the friction element taking place under the action of gravity, while the other part remains urged by the spring means in contact with the ball or roller between it and the wedge member.

Conveniently, the tappet part cooperating with the friction element may be substantially larger and heavier than the part co-operating with the wedge member.

If desired, where the brake actuator assembly employs rollers between the cooperating inclined wedge and tappet surfaces, a resilient bias may be imparted to the rollers, acting away from the free inner end or crown of the wedge member. Such roller bias thus acts substantially in the same direction and sense as the movement which is made by the wedge member when displaced in a brake-actuating direction, and serves to prevent movement of a roller down the inclined surface of its associated tappet, that is, towards the crown of the wedge member.

The resilient bias may advantageously be imparted to a roller by means of a compression spring located in a spring chamber arranged on the actuator opposite the crown of the wedge member and may be transmitted from the compression spring to the roller by means such as a stirrup positioned between the spring and axial extensions or spindles formed on the roller.

The invention will be described further, by way of example, with reference to the accompanying drawings, in which:

FIG. 1 is a sectional elevation of a wedge-type actuator embodying the invention, FIG. 2 is a front elevation of a drum brake assembly including the actuator of FIG. 1, and FIG. 3 is a sectional detail of a stirrup.

As shown in FIG. 1 of the drawings, a brake actuator assembly comprises a housing 10 having a pair of oppositely directed cylinders 12 between which is a chamber 14 receiving a wedge member 16 having inclined wedge surfaces 18 formed at its free, inner end region. In each cylinder 12 is displaceably arranged a tappet generally denoted 20 and made of two parts 22 and 24, of which the outer part 24, intended to act in conventional fashion with a friction element (not shown) is substantially larger and heavier than the part 22. The tappet parts 22 and 24 are formed from their adjoining ends with axial blind bores which, when the two parts are aligned in the cylinder 12, constitute a spring chamber for receiving a compression spring 26 which urges the tappet parts in opposite directions. The tappet part 22, which has an inclined surface 28 in spaced parallel relation with the wedge surface 18, is thus urged against a roller 30 to maintain the same in secure rolling abutment with both these surfaces, while the tappet part 24 is maintained butted against the friction element.

In the operation of the illustrated actuator assembly, when the friction element is biased by its usual return spring 40 in a direction away from the braking surface against which it is intended to act, the two tappet parts 22 and 24 are butted against one another and effectively constitute a unitary tappet which is capable of displacement as a single entity when the wedge member 16 is moved in brake applying and releasing directions. In order for the return spring 40 to retain the two parts in abutting relationship, the spring 40 must have greater strength than the compression spring 26. Should the vehicle wheel pass over a hole in the road surface, however, causing the friction element to overcome the bias of its return spring, the inertia of the heavier tappet part 24 causes it to follow the friction element, while the compression spring 26 expands to maintain the lighter part 22 in contact with the roller 30 and to maintain the roller 30 properly aligned between the inclined surfaces 18 and 28.

By virtue of the actuator assembly provided by the invention, therefore, roller alignment (or ball alignment, where balls are used) is preserved without the need for a separate roller cage or carrier which has been suggested in some prior proposals. Again, the assembly enables seats 32 for the free inner end or crown portion of the wedge member 16 to be formed integrally with the housing 10, preferably in a pocket 11 provided as by pressing in the housing.

The actuator as described with reference to FIG. 1 is shown in FIG. 2 mounted in a drum brake assembly including a pair of diametrically opposed, twin-webbed brake shoes 34 carried on a torque plate 36. Each brake shoe 34 has the customary friction lining 33 and the actuator housing 10 is illustrated as arranged between one pair of adjacent ends of the brake shoes, a suitable abutment member 38, which may include wear-adjustment means (not shown), being arranged between the other adjacent pair of ends of the brake shoes. The shoe return springs 40 act between each said pair of ends to normally urge the shoes 34 in a direction away from their co-operating braking surface, usually a brake drum. It will be noted from FIG. 1 that the outer part 24 of each tappet 20 engages a pin 42 which is mounted between the twin webs 35 of the associated brake shoe 34 and that the ends of the shoes 34 are normally urged by the return springs 40 against abutment surfaces on the actuator housing 10.

For the purpose of safeguarding the retention and alignment of each roller 30 between its associated inclined wedge and tappet surfaces 18 and 28, the pocket 11 is formed with an aperture 44 which is closed by a cap 46 secured to the pocket, and the cap 46 defines a chamber receiving a compression spring 48. The spring 48 acts against the base of a U-shaped stirrup 50, the limbs 52 of which (FIG. 3) straddle the wedge member 16 and bear against the roller spindles 31, so that the spring 48 biases the rollers 30 in a direction away from the crown of the wedge member.

In use, the effect of the spring 48 is to prevent either roller 30 from moving singly down its associated tappet surface 18 towards the crown of the wedge member 16. If by chance the roller tends to move in the opposite direction, it will normally be returned by the wedge angle under the action of the friction element return spring.

I claim:

1. In brake actuating means comprising a housing formed with an internal central chamber and a pair of oppositely directed, aligned cylinders opening directly from said housing, a tappet in each cylinder, at least one wedge member within said chamber between said cylinders and tappets, and at least one rolling element between each tappet and said wedge member for transmitting a brake operating movement of said wedge member to said tappets, the improvement wherein each tappet comprises two individual and normally contiguous parts, spring means acting between said parts for urging the outer tappet part in each cylinder towards the outer end of said cylinder and the inner tappet part towards the inner end of said cylinder and against the rolling element adjacent thereto, and second spring means of greater strength than said first spring means acting on said parts in opposition to said first spring means to retain said parts in normally solid abutting engagement with each other.

2. Brake actuating means as set forth in claim 1, wherein the outer tappet part in each cylinder is substantially larger and heavier than the inner tappet part in said cylinder.

3. Brake actuating means as set forth in claim 1, further comprising means in said housing for imparting to the rolling elements, a resilient bias acting away from the free inner end of the wedge member in said central chamber.

4. Brake actuating means as set forth in claim 3, wherein said rolling elements are rollers, a pocket formed on said housing opposite the inner end of said wedge member and internally defining a spring chamber, a compression spring in said chamber, axial extensions on said rollers, and a stirrup between said compression spring and the axial extensions of said rollers.

5. A vehicle drum brake comprising a torque plate adapted for securing to a vehicle, a pair of arcuate, diametrically opposed brake shoes on said torque plate, an abutment member between one adjacent pair of corresponding ends of said brake shoes, a brake actuator housing between the other pair of ends of said brake shoes, said housing being formed with an internal central chamber and a pair of oppositely directed, aligned cylinders opening directly from said chamber, a two-part tappet in each cylinder, each tappet part being formed with a blind axial recess in its end facing the associated tappet part, a compression spring in the recesses between each pair of tappet parts in a cylinder for urging said tappet parts away from one another, a wedge member within said internal chamber between said cylinders and the inner tappet parts therein, roller means between said wedge member and each of said inner tappet parts, and brake shoe retraction springs acting between said brake shoes for normally maintaining said shoe ends respectively against said abutment member and said actuator housing, said retraction springs further acting normally to overcome said compression springs and hold the two parts of each tappet closed against one another with the inner tappet part bearing against its associated roller means and the outer tappet part bearing against an associated brake shoe end.

6. A vehicle drum brake as set forth in claim 5, wherein each brake shoe comprises twin webs and a pin passing between said webs at the shoe end which abuts said actuator housing, the outer part of the associated tappet engaging said pin.

References Cited

UNITED STATES PATENTS

| 2,096,622 | 10/1937 | Sneed | 188—152 X |
| 2,148,240 | 2/1939 | La Brie | 188—152 |
| 2,224,215 | 12/1940 | Chartock et al. | 188—152 |
| 3,139,762 | 7/1964 | Alfieri | 188—152 X |

FOREIGN PATENTS 799,109   3/1936   France.

MILTON BUCHLER, *Primary Examiner.*

B. S. MOWRY, T. W. BUCKMAN, *Assistant Examiners.*